United States Patent [19]

Fukuma et al.

[11] Patent Number: 5,167,685
[45] Date of Patent: Dec. 1, 1992

[54] METHOD FOR MANUFACTURING A FIBER TYPE COUPLER

[75] Inventors: Masumi Fukuma; Masayuki Shigematsu, both of Yokohama, Japan

[73] Assignee: Sumitomo Electric Industries, Ltd., Osaka, Japan

[21] Appl. No.: 670,000

[22] Filed: Mar. 15, 1991

Related U.S. Application Data

[62] Division of Ser. No. 433,343, Nov. 8, 1989, Pat. No. 5,046,804.

[30] Foreign Application Priority Data

Nov. 21, 1988 [JP] Japan .................. 63-294414
Nov. 25, 1988 [JP] Japan .................. 63-297489

[51] Int. Cl.⁵ .................. C03B 37/14; G02B 6/24
[52] U.S. Cl. .................. 65/4.2; 65/4.21; 385/96; 385/98
[58] Field of Search .......... 65/4.2, 4.21, 4.3, 4.4; 350/96.15, 96.16, 96.2, 96.21; 385/96, 98

[56] References Cited

U.S. PATENT DOCUMENTS

| | | | |
|---|---|---|---|
| 3,579,316 | 5/1971 | Dyott et al. | 65/4 |
| 4,291,940 | 9/1981 | Kawasaki et al. | 65/4.2 |
| 4,377,403 | 3/1983 | McLandrich | 65/4.21 |
| 4,392,712 | 7/1983 | Ozeki | 350/96.16 |
| 4,410,346 | 10/1983 | Aulich et al. | 65/4.2 |
| 4,426,215 | 1/1984 | Murphy | 65/4.21 |
| 4,439,221 | 3/1984 | Smyth et al. | 65/4.21 |
| 4,449,781 | 5/1984 | Lightstone et al. | 350/96.16 |
| 4,490,163 | 12/1984 | Jochem et al. | 65/4.21 |
| 4,591,372 | 5/1986 | Bricheno et al. | 65/4.2 |
| 4,632,513 | 12/1986 | Stowe et al. | 350/320 |
| 4,704,151 | 11/1987 | Keck | 65/4.1 |
| 4,726,643 | 2/1988 | Imoto et al. | 65/4.21 |
| 4,750,926 | 6/1988 | Berkey | 65/2 |
| 4,772,085 | 9/1988 | Moore et al. | 350/96.16 |
| 4,773,924 | 9/1988 | Berkey | 65/4.21 |
| 4,799,949 | 1/1989 | Keck et al. | 65/4.21 |
| 4,869,570 | 9/1989 | Yokohama et al. | 350/96.16 |
| 4,877,304 | 10/1989 | Bhagavatula | 350/96.29 |
| 4,902,323 | 2/1990 | Miller et al. | 65/4.21 |
| 4,902,324 | 2/1990 | Miller et al. | 65/4.21 |
| 4,906,068 | 3/1990 | Olson et al. | 350/96.15 |
| 4,915,467 | 4/1990 | Berkey | 350/96.15 |
| 4,925,269 | 5/1990 | Scrivener | 350/96.15 |
| 4,931,076 | 6/1990 | Berkey | 65/4.2 |

FOREIGN PATENT DOCUMENTS

| | | |
|---|---|---|
| 58-91403 | 5/1983 | Japan . |
| 59-195615 | 11/1984 | Japan . |
| 60501427 | 8/1985 | Japan . |
| 60-232307 | 11/1985 | Japan . |
| 6163810 | 4/1986 | Japan . |
| 62-69206 | 3/1987 | Japan . |
| 63-118705 | 5/1988 | Japan . |
| 63-163308 | 7/1988 | Japan . |
| 63-217313 | 9/1988 | Japan . |
| 2204145 | 11/1988 | United Kingdom . |

OTHER PUBLICATIONS

Dyott et al., Polarization holding directional couplers, SPIE vol. 479 Fiber Optic couplers, 1984, pp. 23-27.

*Primary Examiner*—Robert L. Lindsay
*Attorney, Agent, or Firm*—Stevens, Davis, Miller & Mosher

[57] ABSTRACT

A method for manufacturing a fiber type coupler of the present invention by fusing and elongating a plurality of optical fibers is characterized in that a multi-wire optical fiber wire is used as the plurality of optical fibers.

14 Claims, 10 Drawing Sheets

Loss in fusing process

Result of experiment

METHOD FOR MANUFACTURING A FIBER TYPE COUPLER

This is a divisional of application Ser. No. 433,343 filed Nov. 8, 1989 now U.S. Pat. No. 5,046,804, granted Sep. 10, 1991.

BACKGROUND OF THE INVENTION

1. Field of the Invention

The present invention relates to a method for manufacturing a fiber type coupler by fusing and elongating a plurality of optical fibers.

2. Related Background Art

FIG. 1 is a block diagram which shows a related background art manufacturing method of the fiber type coupler. The related background art manufacturing method is now explained. Two optical fiber wires of 50 cm length are prepared. Each of the optical fiber wires has a plastic jacket and an RIV (room temperature vulcanized silicon) coating. The coatings of the optical fiber wires are partially removed, and the optical fibers 1 having the coatings partially removed are contacted to each other and they are fixed by fixing members 2 in the contacted state. In this case, a photo-sensor 3 and a power meter 4 are connected to one end of each optical fiber, and a light source 5 is connected to the other end.

Then, the contacted optical fibers are heated by a burner 6, and a monitoring light from the light source 5 is sensed by the photo-sensors 3 and measured by the power meters 4 in order to monitor a split ratio at the coupler area. When the split ratio reaches a desired value, the elongation is stopped and a protective member is molded to form the fiber type coupler (see Japanese PCT published Patent (A) 60-501427).

A vertical adjuster for adjusting a vertical position of the optical fiber and a horizontal adjustor for adjusting a horizontal position are used, and the optical fibers are positioned vertically and horizontally. (See Japanese Patent Application 59-88166).

However, in the two-direction positioning method described above, there is a difference among tensile force applied to the optical fibers when they are fixed to an optical fiber fixing member. (Refer to Japanese Laid-Open (KOKAI) Patent Application 63-118705)

FIG. 2 is a perspective view which illustrates an affect of the tensile force in the fusing process. FIG. 2A shows a fiber type coupler manufactured under a constant tensile force applied during the fusing process, and FIG. 2B shows a fiber type coupler manufactured under different tensile force applied during the fusing process. When the applied tensile forces are different, the coupler is bent at a fusing region A because the tensile forces are released in the molten state, and a twist is generated. The bend or twist at the fusing region A increases an insertion loss of the fiber type coupler. Further, since the bending state is not constant, a reproducibility of the fiber type coupler is low and hence a yield is low.

In order to eliminate the above drawbacks, a manufacturing apparatus has been improved. (See Japanese Laid-Open (KOKAI) Patent Application 63-118705). In this apparatus, in the position adjustment process of the manufacture of the fiber type coupler, the optical fibers are fixed to a movable table to which a constant force is applied so that the optical fibers are positioned under a uniform tensile force applied to the optical fibers. In this manner, the bend and twist at the fusing area are reduced.

However, in order to keep the tensile force constant, means for balancing the tensile forces is additionally required in the conventional manufacturing apparatus. As the diameter of the optical fiber is reduced, or as the number of wires increases, it becomes harder to keep the tensile forces uniform and a higher precision control is required. As a result, the cost of the apparatus rises.

In the related background art manufacturing method of the fiber type coupler, the photo-sensor must be connected to one end of the optical fiber. As a result, the workability in the mass production is poor.

SUMMARY OF THE INVENTION

It is an object of the present invention to provide a manufacturing method which can simply reduce the bend and twist in the fusing and elongating processes, attains high reproducibility and improves a manufacturing yield.

It is other object of the present invention to improve a work efficiency in a manufacturing process of the fiber type coupler.

In order to achieve the above objects, the method for manufacturing a fiber type coupler of the present invention by fusing and elongating a plurality of optical fibers is characterized in that a multi-wire optical fiber wire is used as said plurality of optical fibers.

In accordance with the present invention, the process time to manufacture the fiber type coupler is shortened. In the mass production process, a significant process time is shortened by shortening the process time to manufacture the individual fiber type couplers.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENT

Figure 1:
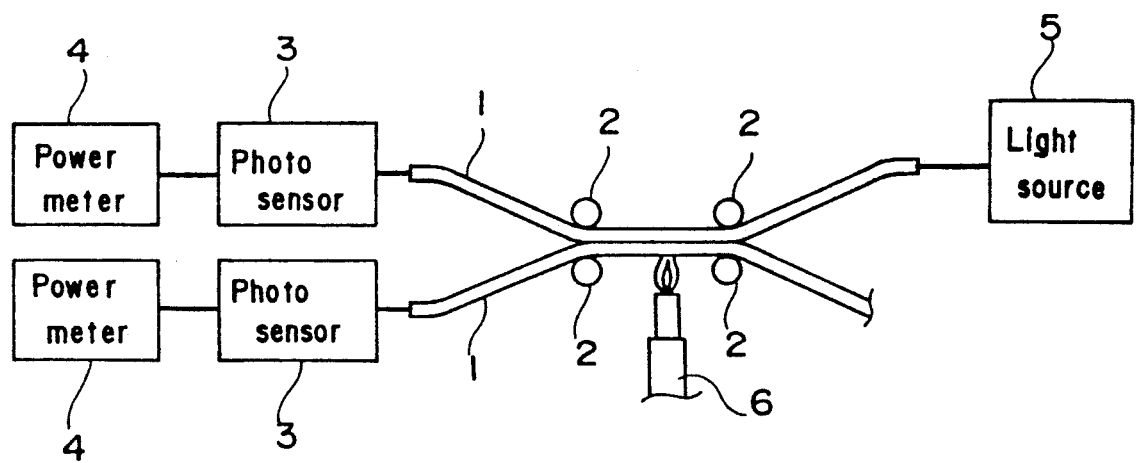
FIG. 1 is a block diagram of a related background art method for manufacturing the fiber type coupler.
Figure 2A:
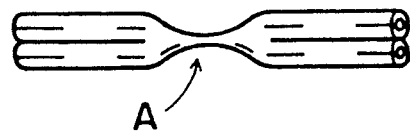
FIGS. 2A and 2B illustrate an affect of a tensile force in a fusing process.
Figure 2B:
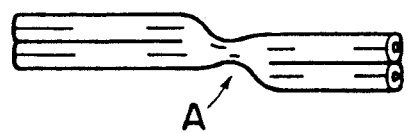
Figure 3:
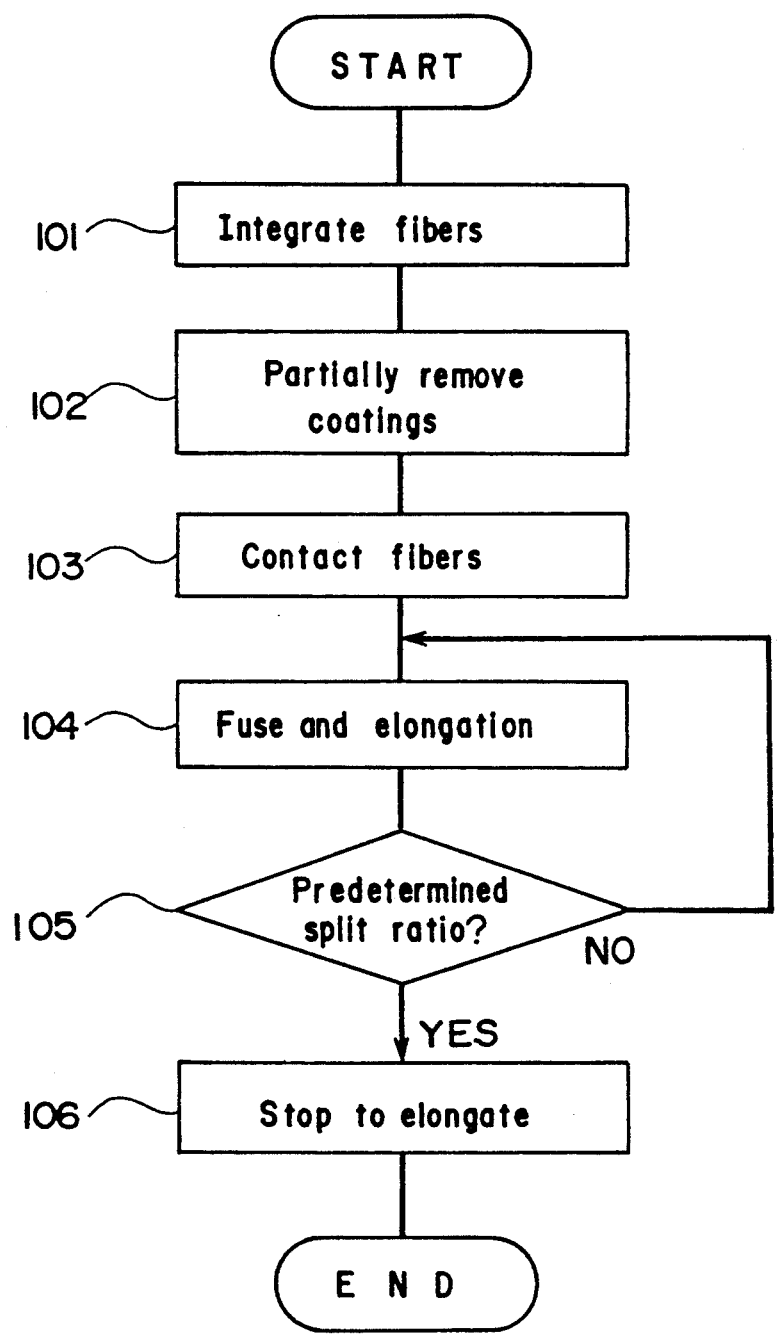
FIG. 3 shows a flow chart of a method for manufacturing a fiber type coupler in accordance with one embodiment of the present invention.

FIG. 3 shows a flow chart of the method for manufacturing the fiber type coupler of the present embodiment, and FIG. 4A to 4F show process charts of the fiber type coupler of the present embodiment.

Figure 4A:
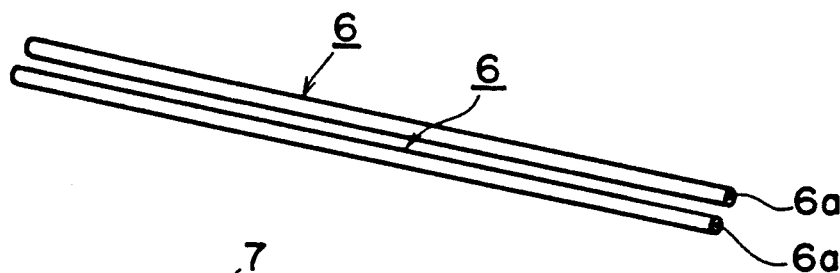
FIGS. 4A to 4F show process charts of the method for manufacturing the fiber type coupler in accordance with the one embodiment of the present invention.
Figure 4B:
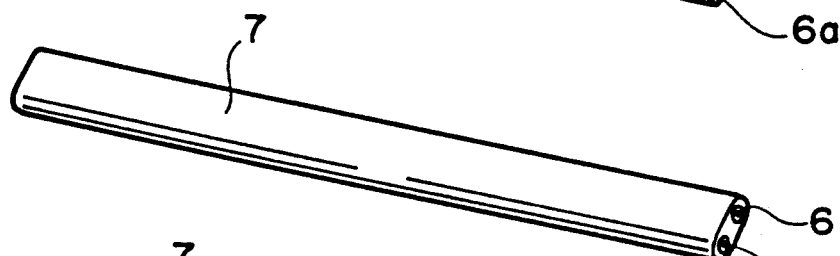
Figure 4C:
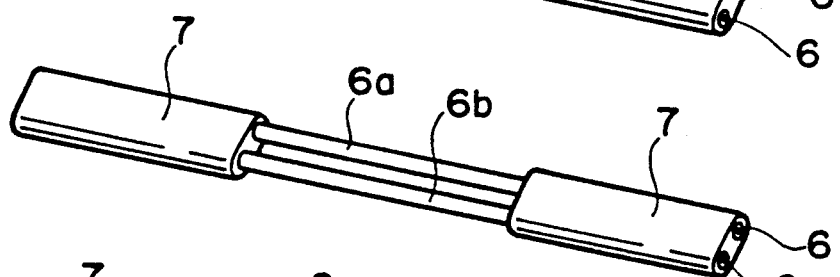
Figure 4D:
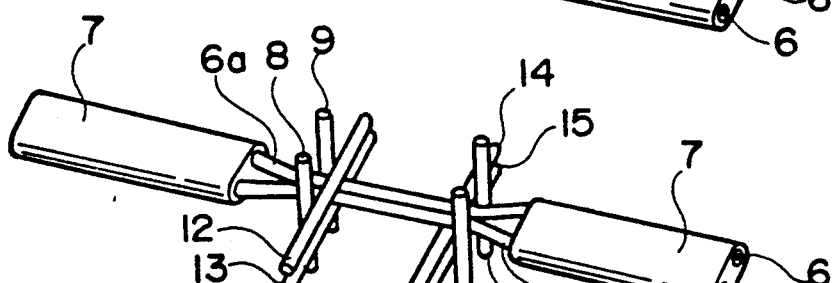

In a step 101, a plurality of optical fiber elementary wires 6 having primary coating applied thereon are arranged in parallel to each other along a longitudinal direction (optical axis) (see FIG. 4A), and a coating 7 is applied to integrate the wires 1 under the same tensile force (see FIG. 4B). The optical fibers to be integrated may be optical fibers having no primary coating applied thereto or optical fibers having secondary coating applied thereto. What is important is that the optical fibers are fixed under the constant tensile force. Accordingly, for example, two coated optical fibers may be supplied under the same tensile force to form an integrated multi-wire optical fiber wire (see Japanese Laid-Open (KOKAI) Patent Application 61-63810). The optical fiber elementary wires 6 to be integrated need not necessarily be arranged in parallel to each other.

In a step 102, the coating 7 of the integrated multi-wire optical fiber wire and the primary coatings of the optical fiber elementary wires 6 are partially removed (see FIG. 4C), and the stripped optical fibers 6 are positioned in two directions so that they are fixed in a contact state (step 103). Specifically, they are horizontally positioned by horizontal positioning members 8, 9, 10 and 11, and vertically positioned by vertical positioning members 12, 13, 14 and 15 (see FIG. 4D).

Figure 4E:
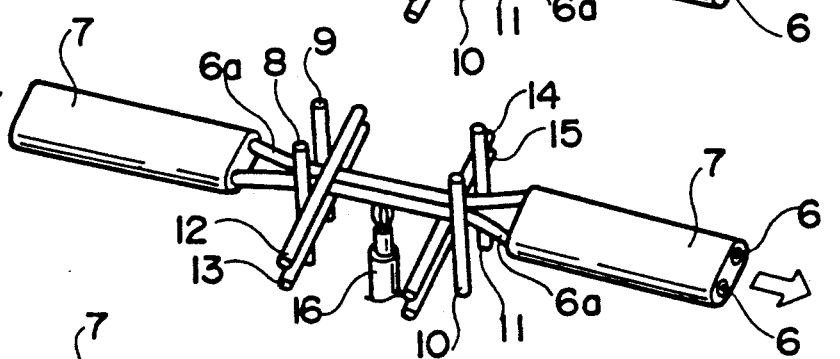
Figure 4F:
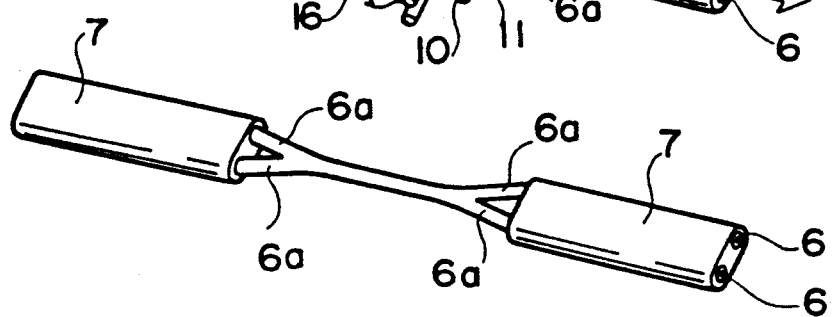
Figure 5:
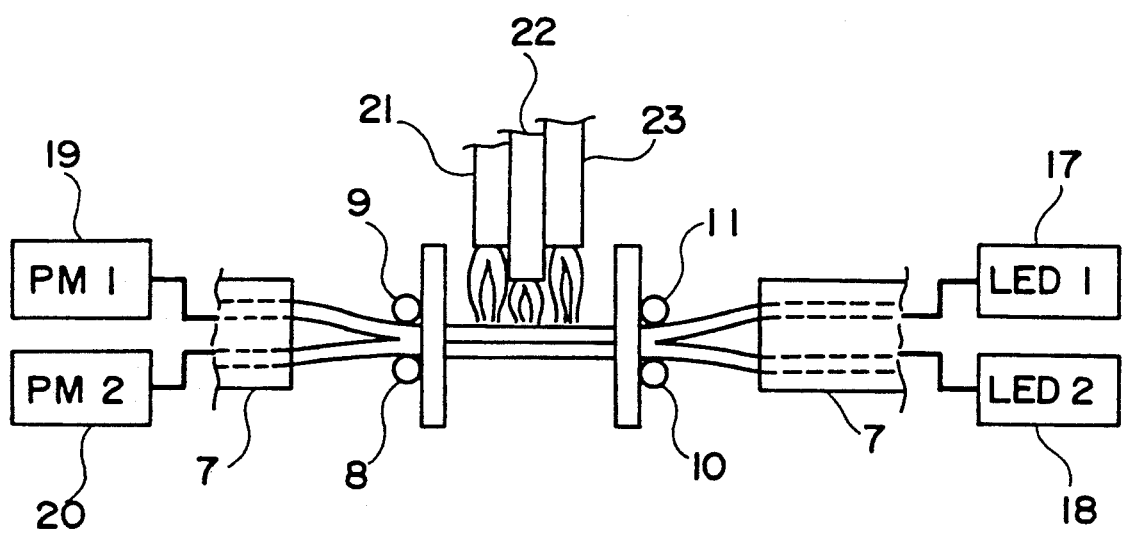
FIG. 5 illustrates a monitoring method applicable to the method for manufacturing the fiber type coupler of the present invention.

In a step 104, the contacted optical fibers 6 are fused by an acetylene burner 16 and the fused region are elongated along the optical axis (see FIG. 4E). For example, as shown in FIG. 5, LED light sources 7 and 8 are connected to the first ends of the optical fibers 6, power meters (PM) 9 and 20 are connected to the second ends, and three burners 21, 22 and 23 which function as heaters are arranged along the optical axis. A split ratio in the fuse-elongation process is monitored (step 105). When the split ratio reaches a predetermined value, the extension is stopped (step 106), but if the split ratio does not reach the predetermined value, the fuse (or heat)—elongation process is continued (step 104). In the step 106, the fiber type coupler is manufactured (see FIG. 4F).

The present invention is not limited to the above embodiment. For example, the number of optical fibers is not limited to two, and a single mode fiber or multimode fiber may be used.

A dispersion-shifted fiber having a zero dispersion wavelength shifted to 1.55 μm at which a quartz optical fiber exhibits a minimum loss may be used as the optical fiber.

A result of experiment for the present invention is now explained. In the experiment, a two-wire web type optical fiber wire having two optical fiber elementary wires integrated parallelly was manufactured, and a loss in the fusing process of the optical fibers was measured.

The manufacturing condition of the fiber type coupler used in the experiment is first explained.

The optical fiber elementary wires used for the fiber type coupler of the present invention were single mode fibers having MFD of 9.5±1 μm and normal wavelength of 1.3 μm. They were finished by ultraviolet ray cured resin to have an 250 μm. Those optical fiber elementary wires were arranged at a predetermined pitch, and finished by ultraviolet ray cured resin to have a width of 0.6 mm and a thickness of 0.4 mm. A web of a 300 meters length was manufactured at a taping tensile force of 50±2 grams, and a fiber velocity of 40 meters/minute. A fusing condition in forming the fiber type coupler was a clamping pitch of 8 mm and an LED light source having a wavelength of 1.3 μm. As the heater, three burners having a bore diameter of 0.2 mm which used acetylene-oxygen (acetylene 1 cm$^3$/min, oxygen 30 cm$^2$/min) as combustion gas were arranged along the optical axis (see FIG. 5). The three burners were arranged at the intervals of 5 mm, 3 mm and 5 mm, and the fusing time was 30 seconds.

Regarding the related background art method, two optical fiber elementary wires were fixed one by one with best care to attain uniform tensile force.

Figure 6A:
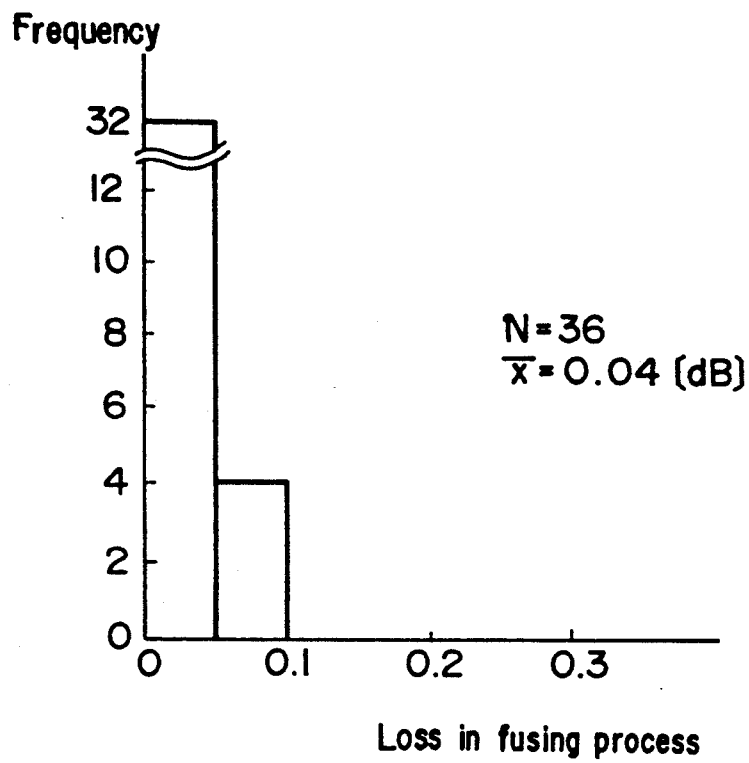
FIGS. 6A and 6B are graphs showing a result of an experiment for the present invention.
Figure 6B:
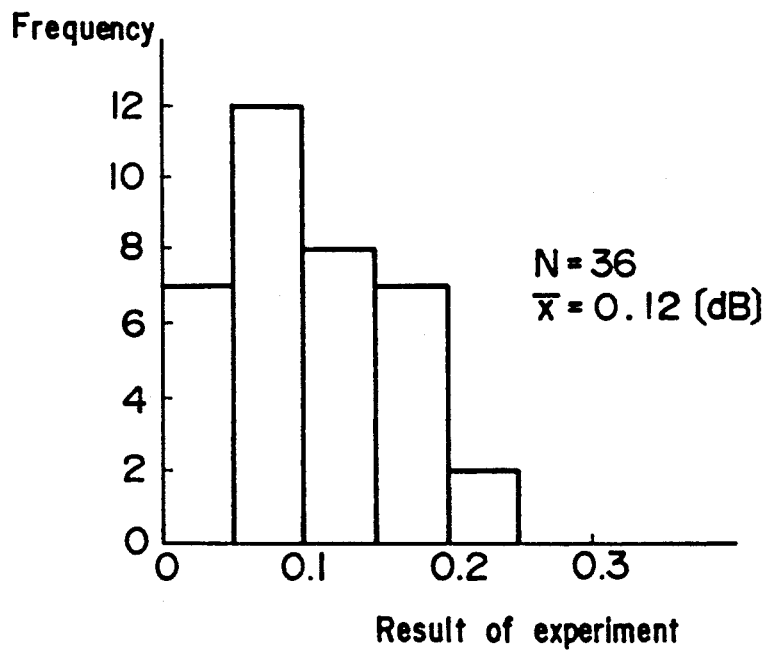

FIGS. 6A and 6B show the result of the experiment. A change (attenuation) of a power was calculated based on the light sources and the power meters connected to the fibers, as a loss in the fused joint, and it is represented as a frequency polygon. FIG. 6A shows that for the manufacturing method of the present invention, and FIG. 6B shows that for the related background art manufacturing method. It is seen from the experiment that the manufacturing method for the fiber type coupler of the present invention provide a smaller loss in the fusing process and higher reproducibility than those of the related background art manufacturing method.

Figure 7:
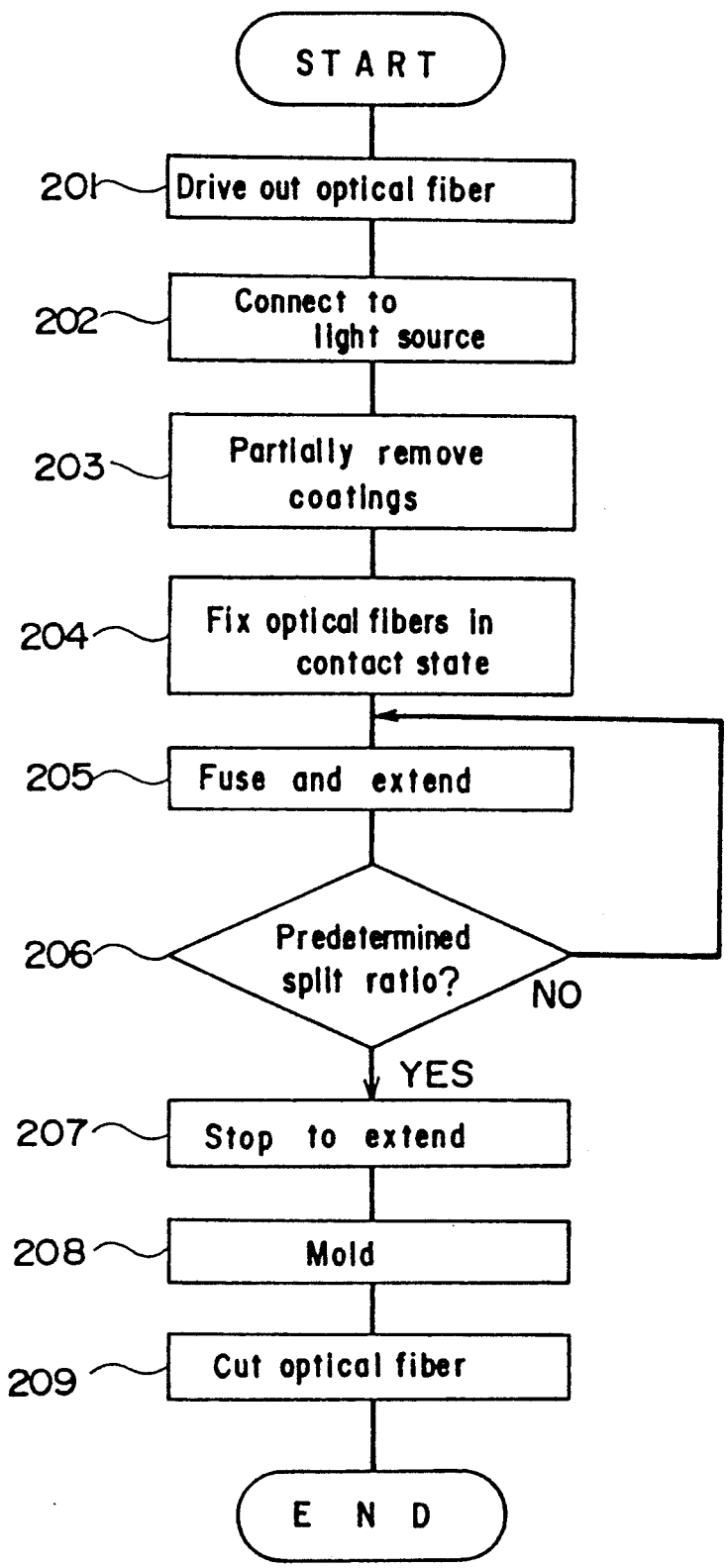
FIG. 7 shows a flow chart of a method for manufacturing a fiber type coupler in accordance with one embodiment of the present invention.

FIG. 7 shows a flow chart of a method for manufacturing a fiber type coupler in accordance with another embodiment, and FIG. 8 shows a manufacturing process of the fiber type coupler of the FIG. 7 embodiment.

Figure 8A:
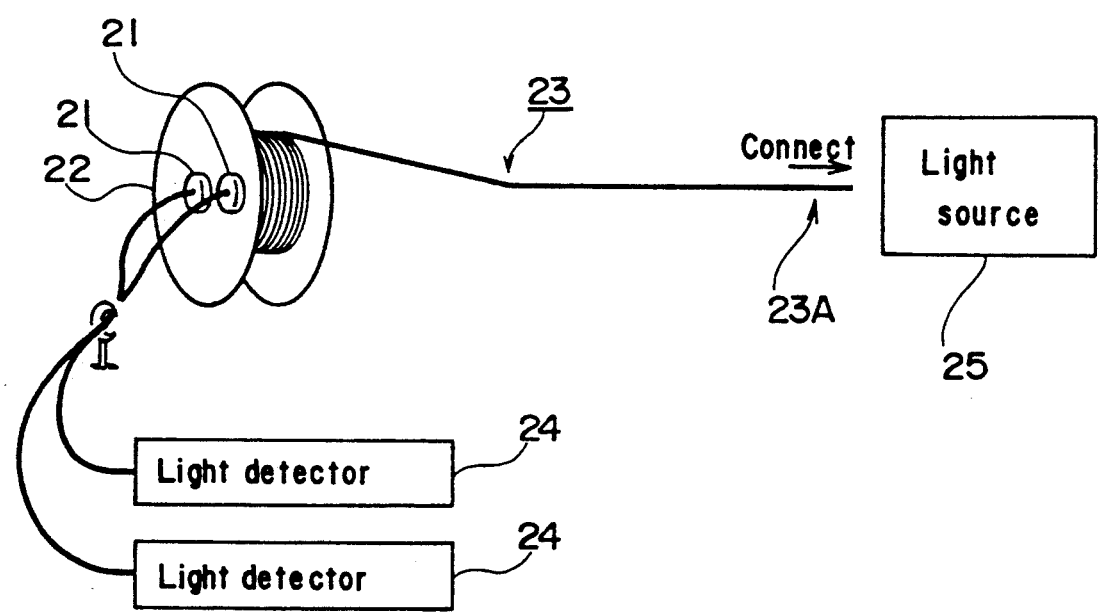
FIGS. 8A to 8E show manufacturing process charts of the fiber type coupler of the one embodiment.
Figure 8B:
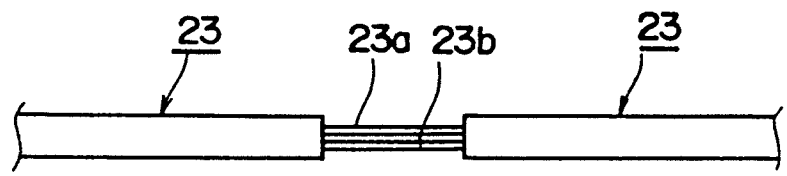

As shown in FIG. 8A, a rotatable bobbin 22 having a plurality of optical rotary joints 21 attached thereto is prepared. A multi-wire optical fiber wire 23 is wound on the bobbin 22. A leading end (a start end from the bobbin) of the multi-wire optical fiber wire 23 is separated, and individual optical fibers accommodated in the multi-wire optical fiber wire 23 are connected to the optical rotary joints 21. The optical rotary joints 21 are also connected to light detectors 24 which comprise photo-sensors and power meters. The present embodiment is now explained.

In a step 201, the multi-wire optical fiber wire 23 is driven out of the bobbin 22. Since only the rotary portion; shown) of the bobbin 22 having the multi-wire optical fiber wire 23 wound thereon is rotated, the positions of the optical rotary connectors 21 do not change.

In a step 202, an end 23A of the multi-wire optical fiber wire 23 is connected to a light source 25 (see FIG. 8A). The end may be connected directly to a light emitting device such as an LED, or a monitoring light may be inputted by connecting a light merger.

In a step 203, a portion of a coating of the driven-out multi-wire optical fiber wire 23 is removed. Coatings of the optical fiber elementary wires (optical fibers having primary coatings applied thereto) accommodated in the multi-wire optical fiber wire 23 are also removed. Through the removal of the coatings, the optical fibers are exposed in a stripped state (see FIG. 8B).

Figure 8C:
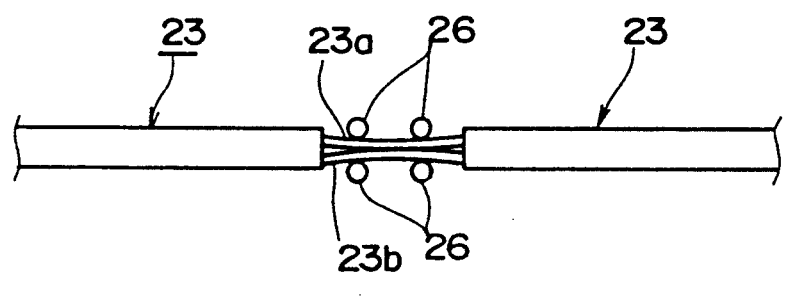
Figure 8D:
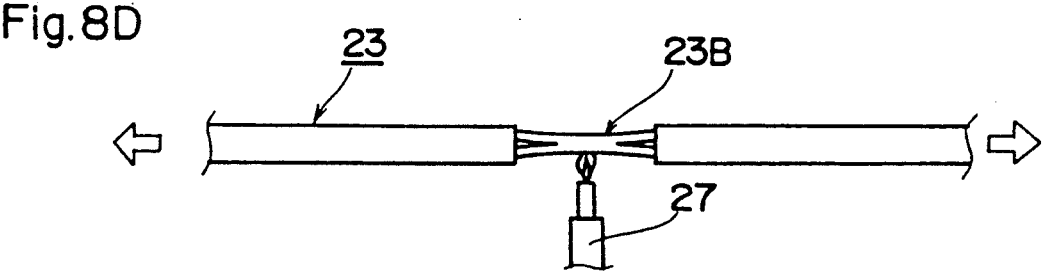

In a step 204, the exposed optical fibers 23a and 23b are fixed while they are contacted to each other by the fixing members 26 (see FIG. 8C). They may be fixed in two directions orthogonal to the optical axis (for example, horizontal direction and vertical direction) in order to increase the fixing force.

In a step 205, the optical fibers are fused by a heater 27 such as an acetylene burner (see FIG. 8D) and the fused region are elongated along the optical axis. A plurality of heaters may be arranged along the optical axis to relieve a temperature distribution applied to the optical fibers. For example, three heaters may be arranged at the intervals of 3 mm, 5 mm and 3 mm.

In a step 206, whether a predetermined split ratio is reached or not is determined by monitoring the light detector. If the predetermined split ratio has not been reached, the fusing and elongation process are further continued (step 205). If the predetermined split ratio is reached, the elongation process is stopped (step 207). In this stage, a coupler member 23B of the fiber type coupler is formed (see FIG. 8D).

Figure 8E:
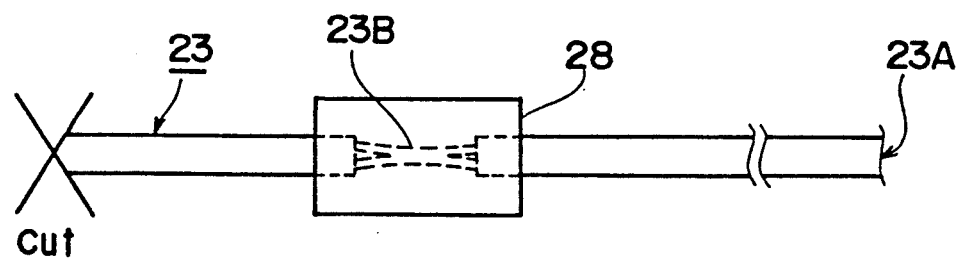

In a step 208, a protective member 28 is molded and the coupler member 23B is fixed (see FIG. 8E). The coupler member 23B is protected by the protective member 28. The protective member 28 may be formed by applying the coating by spraying.

In a step 209, the driven-out multi-wire optical fiber wire 23 is cut on a side of the bobbin (see FIG. 8E) to form the fiber type coupler.

The present invention is not limited to the above embodiment. For example, the light source 25 may be connected to a portion of the driven-out multi-wire optical fiber wire after the portion of the coating of the multi-wire optical fiber wire 23 has been removed.

As the multi-wire optical fiber wire of the present embodiment, a plurality of optical fibers may be arranged along a line orthogonal to the optical axis and they may be integrated by a common coating to form a web type optical fiber wire.

In the present embodiment, the optical rotary joints 21 are used at the junctions of the bobbin 22 and the light detectors 24. Alternatively, the photo-sensors may be mounted on the rotating bobbin and the electrical signals from the photo-sensors may be supplied to the power meters through slip rings arranged externally of the bobbin.

Figure 9A:
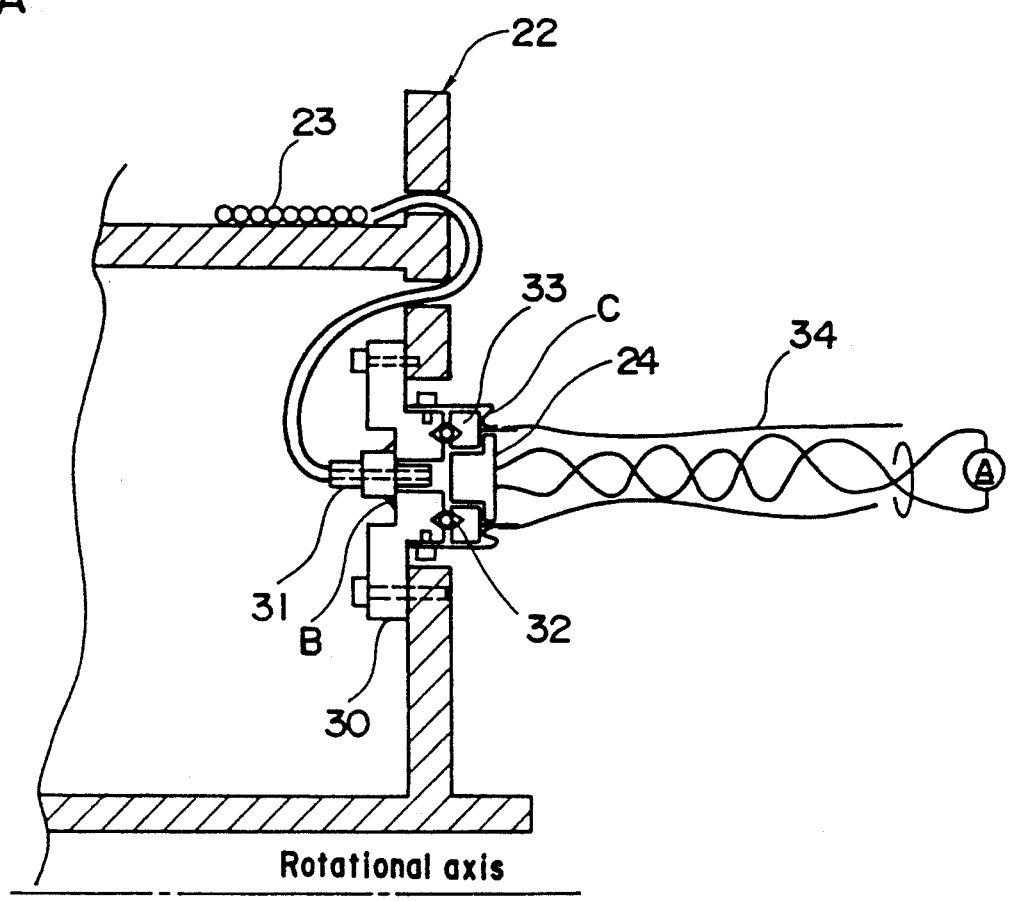
FIG. 9A is a sectional view taken along a rotational axis of a bobbin for the structure of an optical rotary joint.

FIG. 9A is a sectional view taken along rotational axis of a bobbin for the structure of an optical rotary joint. A ferrule 31, which is connected to one end of an optical fiber wire 23, is held by adhesion B to a ferrule holding member 30 which is fixed to the side wall of a bobbin 22. A light detector holding member 33 is attached rotatably to the opposite side of the ferrule holding member 30 by leaf spring C with ball 32 interposed between them. A light detector 24 is held by the light detector holding member 33 so as to receive the light radiated from the ferrule 31.

According to the optical rotary joint, since the radiated light can be received with the large area of light detector 24, the alignment of optical axis between ferrule 31 and light detector 24 can be performed with facility. In this case, ferrule 31 may be connected to a single mode fiber and the light radiated from the ferrule 31 may be transmitted to light detector 24 through a graded index fiber interposed between them.

Figure 9B:
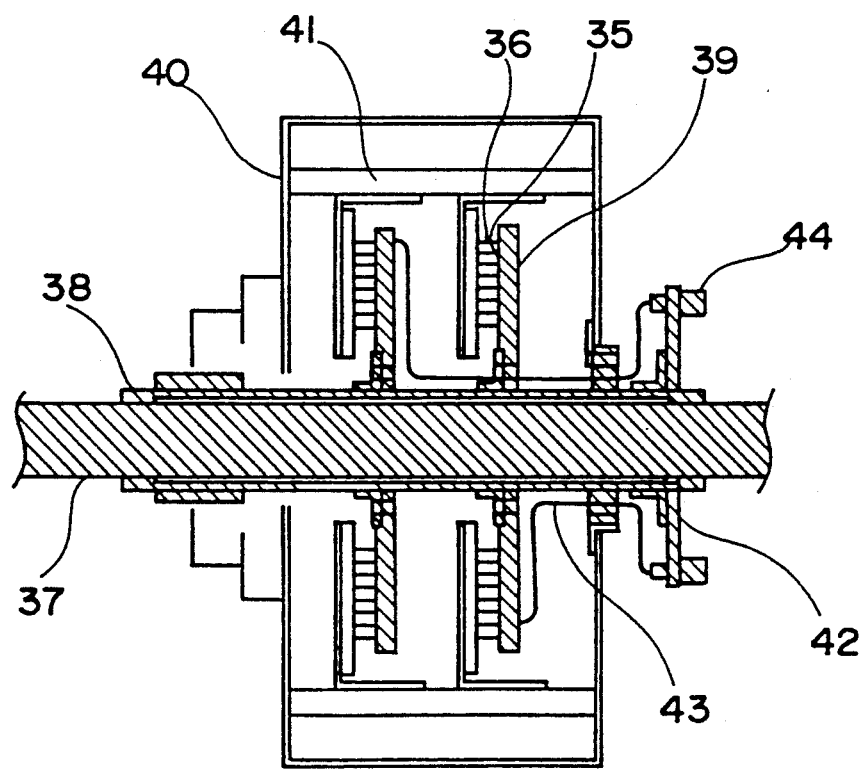
FIG. 9B is a sectional view taken along a rotational axis of a bobbin for the structure of a slip ring.

FIG. 9B is a sectional view taken along a rotational axis of a bobbin for the structure of a slip ring. This slip ring comprises slide ring 35 and brush 36 in its structure.

The slide ring 35 is attached to a ring base 39 provided with the rotational axis 37 of the bobbin (not shown). The pipe 38 is interposed between the ring base 39 and the rotational axis 37. And the brush 36 is fixed to a support 41 fixed to body 40. This body 40 has a fixed terminal board (not shown) on the surface and the rotational terminal board 42 is arranged beside (right side in FIG. 9B) to the body 40 with the pipe 38 interposed between the rotational terminal board 42 and the rotational axis 37. The rotational terminal board 42 and the ring base 39 are connected with lead wire 43. The rotational terminal board 42 has many terminals 44 along the circumference. These terminals 44 are connected to a photodiode (light detector) provided with the bobbin. The electrical signal from the photodiode can be easily transmitted to the fixed terminal board through the slip ring.

Further, the optical rotary joint and slip ring are not limited to the devices having the above structure. For example, FRJ-01, 02, 03 and 03E of Sumitomo Electric Industries, Ltd. can be used for the optical rotary joint and 3TA, 3TBS and 3TC of Meisei Electric Corporation Inc. can be used for the slip ring.

A result of an experiment for the present invention is now explained. In the experiment, two conventional optical fiber elementary wires for 1.3 $\mu$m wavelength communication (outer diameter 125 $\mu$m, MFD 9.5±1 $\mu$m, cutoff wavelength 1.2 to 1.3 $\mu$m), coated by ultraviolet ray cured resin were integrated by a common coating of ultraviolet ray cured resin to form a web type optical fiber wire of 1 km long. The web type optical fiber wire was wound on a plastic bobbin having a drum diameter of 280 mm. Two optical rotary joints were mounted on the plastic bobbin. A single-wire cord of graded index fiber having a clad diameter of 125 $\mu$m, a core diameter of 50 $\mu$m and a refractive index of 1% was used to connect the optical rotary joints to the light detector.

A change of loss when the optical fiber was driven out by 20 meters was only 0.05 dB. Insertion losses of the two optical rotary joints were measured by a cut-back method. The difference thereof was 0.02 dB which is of sufficient precision for monitoring the split ratio.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:
1. A method for manufacturing a fiber type coupler, comprising the steps of:
   (a) providing an optical fiber group having a plurality of bare fibers covered by a common one piece coating,
   (b) removing partially said common coating of said optical fiber group to expose all of the bare fibers therein,
   (c) then arranging said bare fibers to include at least two fibers in a paired arrangement, and
   (d) thereafter fusing said at least two fibers which are disposed in said paired arrangement.

2. A method for manufacturing a fiber type coupler according to claim 1 wherein said optical fiber wire is a web type optical fiber group.

3. A method for manufacturing a fiber type coupler according to claim 1 wherein said plurality of optical fibers are integrated while applying an equal tensile force along the optical axis of each of the plurality of optical fibers.

4. A method for manufacturing a fiber type coupler according to claim 1 wherein said plurality of optical fibers are dispersion-shifted fibers.

5. A method for manufacturing a fiber type coupler according to claim 1 wherein said plurality of optical fibers are quartz dispersion-shifted fibers having zero dispersion wavelength to 1.55 um.

6. A method for manufacturing a fiber type coupler, comprising the steps of:
 (a) providing an optical fiber group having a plurality of bare fibers integrated while applying an equal tensile force along the optical axis thereof and covered by a common one piece coating,
 (b) removing partially said common coating of said optical fiber group to expose all of said bare fibers therein,
 (c) then arranging said bare fibers to include at least two fibers in a paired arrangement, and
 (d) thereafter fusing said at least two fibers which are disposed in said paired arrangement.

7. A method for manufacturing a fiber type coupler according to claim 1, wherein said plurality of optical fibers are single mode fibers.

8. A method for manufacturing a fiber type coupler according to claim 1, wherein said plurality of optical fibers are multi-mode fibers.

9. A method for manufacturing a fiber type coupler according to claim 1, wherein said bare fibers are arranged in a plurality of paired arrangements and said bare fibers are fused in pairs.

10. A method for manufacturing a fiber type coupler according to claim 6, wherein said bare fibers are arranged in a plurality of paired arrangements and said bare fibers are fused in pairs.

11. A method for manufacturing a fiber type coupler, comprising the steps of:
 (a) providing a plurality of bare fibers covered by a common one piece coating,
 (b) removing partially said common coating to expose all of the bare fibers therein,
 (c) then arranging said exposed bare fibers in pairs, and
 (d) thereafter fusing all of the bare fibers in pairs.

12. A method for manufacturing a fiber type coupler, comprising the steps of:
 (a) providing a plurality of bare fibers covered by a common one piece coating,
 (b) removing partially said common coating to expose all of the bare fibers therein,
 (c) then paring and fixing said bare fibers in a contact state, and
 (d) thereafter fusing and elongating the bare fibers in pairs.

13. A method of manufacturing a fiber type coupler by fusing and elongating a plurality of individual optical fibers, comprising the steps of:
 (a) integrating a plurality of individual optical fibers by applying a common one-piece coating to the plurality of individual fibers when the individual fibers are all under substantially the same applied tension along their optical axes to provide a multi-wire optical fiber wire system,
 (b) removing said coating of the multi-wire optical fiber wire system and any individual coatings of the individual fibers along a predetermined length of the optical fiber wire system,
 (c) then contacting the fibers along a part of said length; and
 (d) thereafter fusing and elongating the fibers while they are contacted as in step (c).

14. A method of manufacturing a fiber type coupler according to claim 13, further comprising the steps of, while said tension is being applied to said individual fibers, coupling a light source to one end of the optical fiber wire system, monitoring light emitted from the individual fibers at the other end of the optical fiber wire system and stopping application of tension applied to the individual fibers when a predetermined split ratio is attached.

* * * * *